United States Patent [19]

Bormann et al.

[11] Patent Number: 5,051,546
[45] Date of Patent: Sep. 24, 1991

[54] TROLLEY CARRIAGE

[75] Inventors: Uwe Bormann, Rümmingen; Dieter Goerner, Hausen i.W., both of Fed. Rep. of Germany

[73] Assignee: Wampfler GmbH, Fed. Rep. of Germany

[21] Appl. No.: 482,503

[22] Filed: Feb. 21, 1990

[30] Foreign Application Priority Data

Feb. 24, 1989 [DE] Fed. Rep. of Germany ... 8902224[U]

[51] Int. Cl.$^5$ .................. B60L 13/02; B60L 5/36
[52] U.S. Cl. .................. 191/57; 191/45 A; 104/89
[58] Field of Search .................. 191/45 R, 45 A, 49, 191/50, 52, 57, 60.4, 60.5; 105/220, 221.1, 221.2; 104/246, 89

[56] References Cited

U.S. PATENT DOCUMENTS

| 1,819,886 | 8/1931 | Frank et al. | 191/57 |
| 2,120,775 | 6/1938 | Bogardus | 191/57 X |
| 2,254,142 | 8/1941 | Glasgow | 191/57 X |
| 2,537,866 | 1/1951 | Tanner | 191/57 X |
| 2,761,396 | 9/1956 | Harlan | 104/89 X |
| 3,206,560 | 9/1965 | Parmenter | 191/45 A |
| 3,877,553 | 4/1975 | Ross | 191/49 |
| 4,155,434 | 5/1979 | Howell, Jr. | 191/57 X |
| 4,168,770 | 9/1979 | Segar et al. | 191/57 |
| 4,172,423 | 10/1979 | Monne | 104/89 X |
| 4,234,065 | 11/1980 | Uozumi et al. | 191/49 X |
| 4,991,257 | 2/1991 | Eutebach | 104/246 X |
| 4,991,517 | 2/1991 | Lotzer | 104/89 X |

FOREIGN PATENT DOCUMENTS

| 3417346 | 11/1985 | Fed. Rep. of Germany | 104/246 |
| 1407325 | 6/1965 | France | 191/45 A |
| 55-88501 | 7/1980 | Japan | 191/49 |

*Primary Examiner*—Robert J. Spar
*Assistant Examiner*—Scott L. Lowe
*Attorney, Agent, or Firm*—Pascal & Associates

[57] ABSTRACT

A trolley carriage comprising rollers for carrying the trolley carriage along a bearing rail. The rollers are supported by at least one roller support of the trolley carriage. The bearing rail has live rails which are insulated from one another extending along the bearing rail, and the trolley carriage has sliding contacts which are in flexible contact with the live rails. A common housing part which is connected to at least one roller support via a detachable quick coupling supports the sliding contacts.

10 Claims, 2 Drawing Sheets

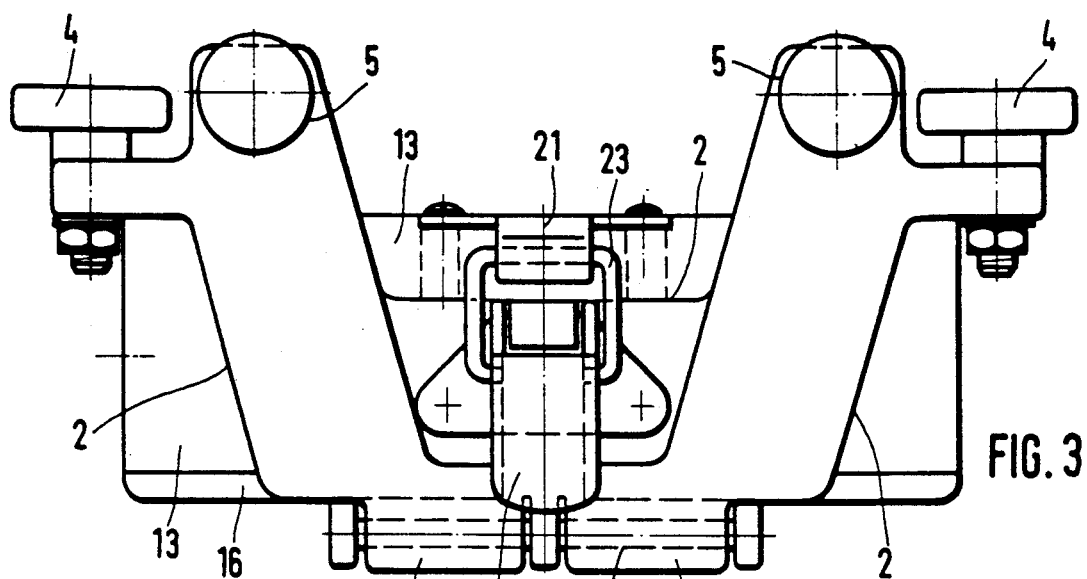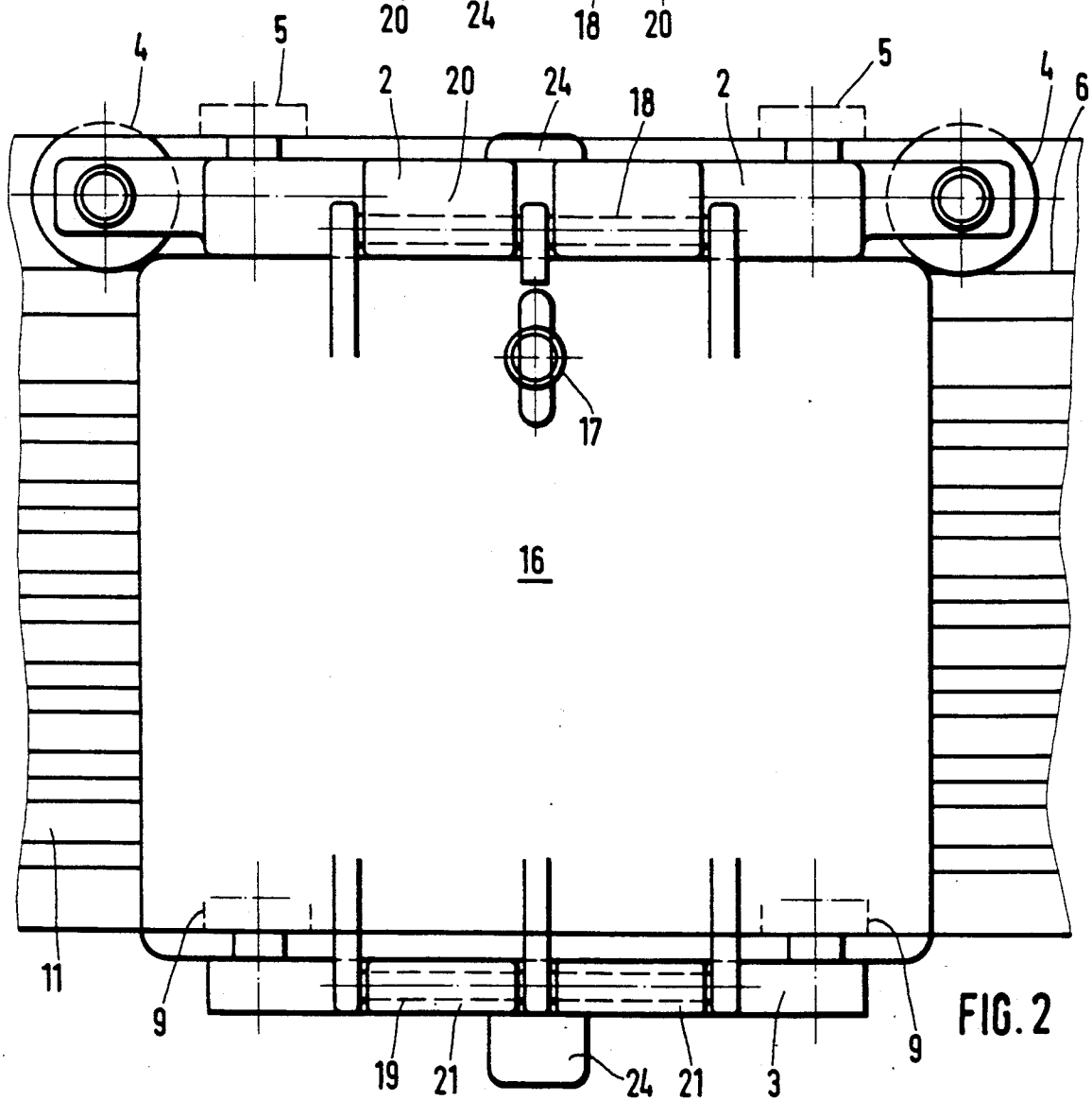

TROLLEY CARRIAGE

BACKGROUND OF THE INVENTION

This invention relates to a trolley carriage of the type that can travel along a bearing rail via rollers.

DESCRIPTION OF THE PRIOR ART

A trolley carriage according to the prior art has a roller support with two spaced pairs of rollers by which the trolley carriage can travel along a C-rail. Live rails which are situated one below the other extend above the C-rail. A vertical bracket is connected to the roller support; horizontally extending sliding arms which have sliding contacts at their front free ends which are in contact with the live rails are hinged to the bracket. The sliding arms are pressed against the live rails by means of springs.

To change the sliding contacts, each sliding arm must be swung out away from the live rail against the pressure of the spring, so that the sliding contact becomes accessible and can then be removed and replaced by a new one. This task requires a large amount of time.

A further disadvantage is that, in order to remove the trolley carriage from the bearing rail, it is necessary to run the carriage to the end of the bearing rail in order to be able to slide it out of the bearing rail at that point.

SUMMARY OF THE INVENTION

An object of this invention is to provide a carriage structure such that the sliding contacts can be changed quickly. In a further embodiment, the trolley carriage structure is such that it can be removed from the bearing rail at any point.

The above object is attained by an embodiment of the invention which is a trolley carriage comprising rollers for carrying the trolley carriage along a bearing rail, the rollers being supported by at least one roller support of the trolley carriage, the bearing rail having live rails which are insulated from one another extending along the bearing rail, the trolley carriage having sliding contacts which are in flexible contact with the live rails, and a common housing part which is connected to at least one roller support via a detachable quick coupling supporting the sliding contacts.

BRIEF DESCRIPTION OF THE DRAWINGS

An embodiment of the invention is described in greater detail in the description below, with reference to the following drawings, in which:

FIG. 2 is a view of the trolley carriage and bearing rail, seen in the direction of arrow A in FIG. 1; and FIG. 3 is a top view of the trolley carriage, seen in the direction of arrow B in FIG. 1.

DETAILED DESCRIPTION OF THE PREFERRED EMBODIMENT

Figure 1:
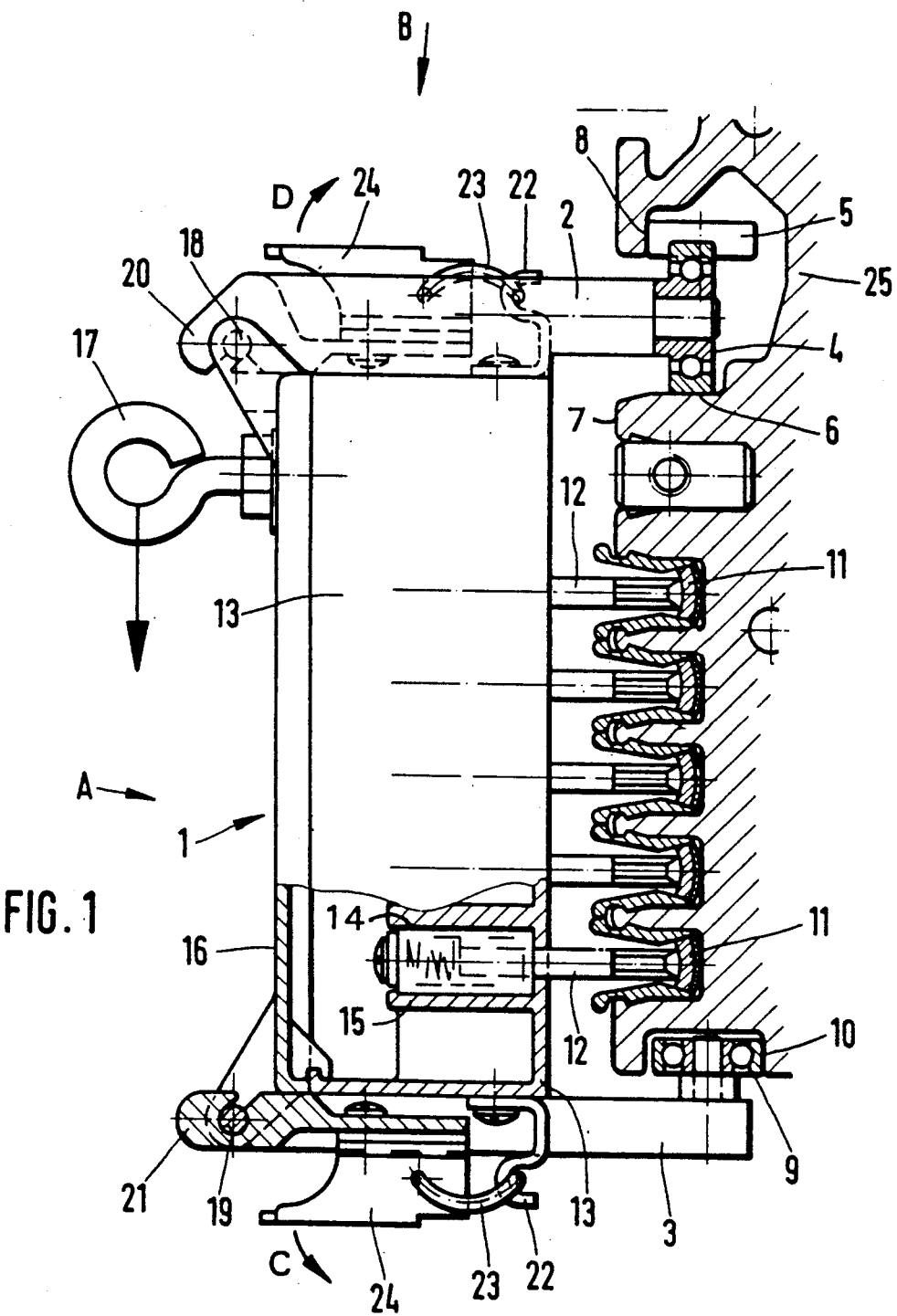
FIG. 1 is a partially sectional side view of the trolley carriage at the bearing rail illustrated in section.

The trolley carriage 1 has an upper roller support 2 and a lower roller support 3. The upper roller support 2 carries a bearing pulley pair 4 as well as a track-supported roller pair 5. The bearing pulley pair 4 have horizontal axes of rotation and run on a horizontally extending support track 6 of bearing rail 7. The track-supported roller pair 5 have vertical axes of rotation and run along a vertical support track 8 of the bearing rail 7. Support track 8 faces away from trolley carriage 1.

The lower roller support 3 supports two additional track-supported rollers 9 having vertical axes of rotation, which can travel back and forth along a further support track 10 which faces the trolley carriage 1.

Five live rails 11, which are insulated from one another and from the bearing rail, extend along bearing rail 7. Sliding contacts 12 of the trolley carriage 1 are in contact with live rails 11.

Trolley carriage 1 has a rectangular cup-shaped housing part 13. In the housing part 13, five chambers 14 are provided one below the other which each support a sliding contact 12 with their ends to the side of the housing. Each of sliding contacts 12 is pressed by a spring 15 in the direction of a corresponding live rail 11.

The side of the housing part 13 opposite to bearing rail 7 is sealed by a cover 16. A suspension hook 17, which presses cover 16 against housing part 13, is screwed together with housing part 13. At the top and at the bottom, cover 16 has a hinged axle 18, 19 respectively, whereby the upper roller 2 is clipped into hinge axle 18 and lower roller support 3 is clipped into hinge axle 19. The hinged clips are designated by 20 and 21.

A hook 22 is fastened to each of the top and bottom of housing part 13. Wire bows 23, which are each supported by a tilting part 24, are hung in these hooks. The tilting parts 24 are each attached with hinged supports to the upper and lower roller support 2, 3. Parts 22-24 thus form a quick coupling in form of a snap closure which can be released when tilting part 24 is swung by hand in the direction of the arrow C.

If the lower tilting part 24 is moved in the direction of the arrow C, then the connection of the lower roller support 3 with housing part 13 is released so that it can now be swung downward about hinged axle 19. If the upper tilting part 24 is also swung in direction of the arrow D and hinged axle 18 is unclipped from clip 20, then housing part 13 with cover 16 can be removed in this way. If suspension hook 17 is then unscrewed, housing part 13 with sliding contacts 12 can be replaced by another housing part 13 with new sliding contacts 12. During this exchange, the upper roller support 2 can remain at bearing rail 7. However, it is also possible to remove the roller support 2 by tilting it clockwise. For this reason, recess 25, in which tracks 6, 8 are formed, is C-shaped and has a horizontal expansion which is greater than the diameter of track-supporting roller 5.

Assembly takes place in reverse order of disassembly. Since roller support 2, 3 can be detached from housing part 13, it is also possible to replace these parts if their rollers are worn.

Suspension hook 17 can be used, for example, to support tools which are supplied with current by trolley carriage 1 via live rails 11 and sliding contacts 12.

When roller support 3 is hung downward, it is also possible to remove trolley carriage 1 without opening the upper snap closure by tilting the trolley carriage 1 clockwise about the C-shaped recess 25.

We claim:

1. A trolley carriage comprising:
    an upper roller support carrying first rollers having vertical axes of rotation and second rollers having horizontal axes of rotation,
    a lower roller support carrying third rollers having vertical axes of rotation,
    a housing having a top and an underside, sliding contacts for engaging line rails supported one below the other by said housing between said top and said underside, and quick couplings detachably connecting each of said upper roller support and said lower roller support to said housing.

2. A trolley carriage as claimed in claim 1 in which said lower roller support is detachably connected to said underside of said housing and said upper roller support is detachably connected to said top of said housing.

3. A trolley carriage as claimed in claim 1 in which each of said quick couplings is comprised of a hook fixed to said housing, a hinge, a tilting part attached to a corresponding roller support by said hinge, and a wire bow supported by the tilting part, each wire bow being locked to a corresponding hook.

4. A trolley carriage as claimed in claim 1 further including a cover closing the side of said housing facing away from the sliding contacts.

5. A trolley carriage as claimed in claim 4 further comprising an object supporting device detachably fixed to said housing.

6. A trolley carriage as claimed in claim 5 in which the object supporting device is screwed to the housing and when screwed thereto holds the cover against the housing.

7. A trolley carriage as claimed in claim 4 in which the lower roller support is swivel-mounted to the cover about a horizontal axis so as to be detachable.

8. A trolley carriage as claimed in claim 4 in which the upper roller support is swivel-mounted to the cover about a horizontal axis so as to be detachable.

9. A trolley carriage as claimed in claim 1 in which the housing contains chambers, and springs are contained within the chambers, which support the sliding contacts.

10. In combination with a trolley carriage as claimed in claim 1 a rail containing an elongated C-cross-section shaped recess containing a horizontal and a vertical support track, said second rollers being supported on the horizontal support track and said first rollers being supported on the vertical support track, the C-shaped recess having a horizontal expansion which is greater than the diameter of the first rollers.

* * * * *